June 5, 1962 W. T. RENTSCHLER 3,037,435
PHOTOGRAPHIC CAMERA HAVING AUTOMATIC EXPOSURE SETTING MEANS
Filed April 4, 1961
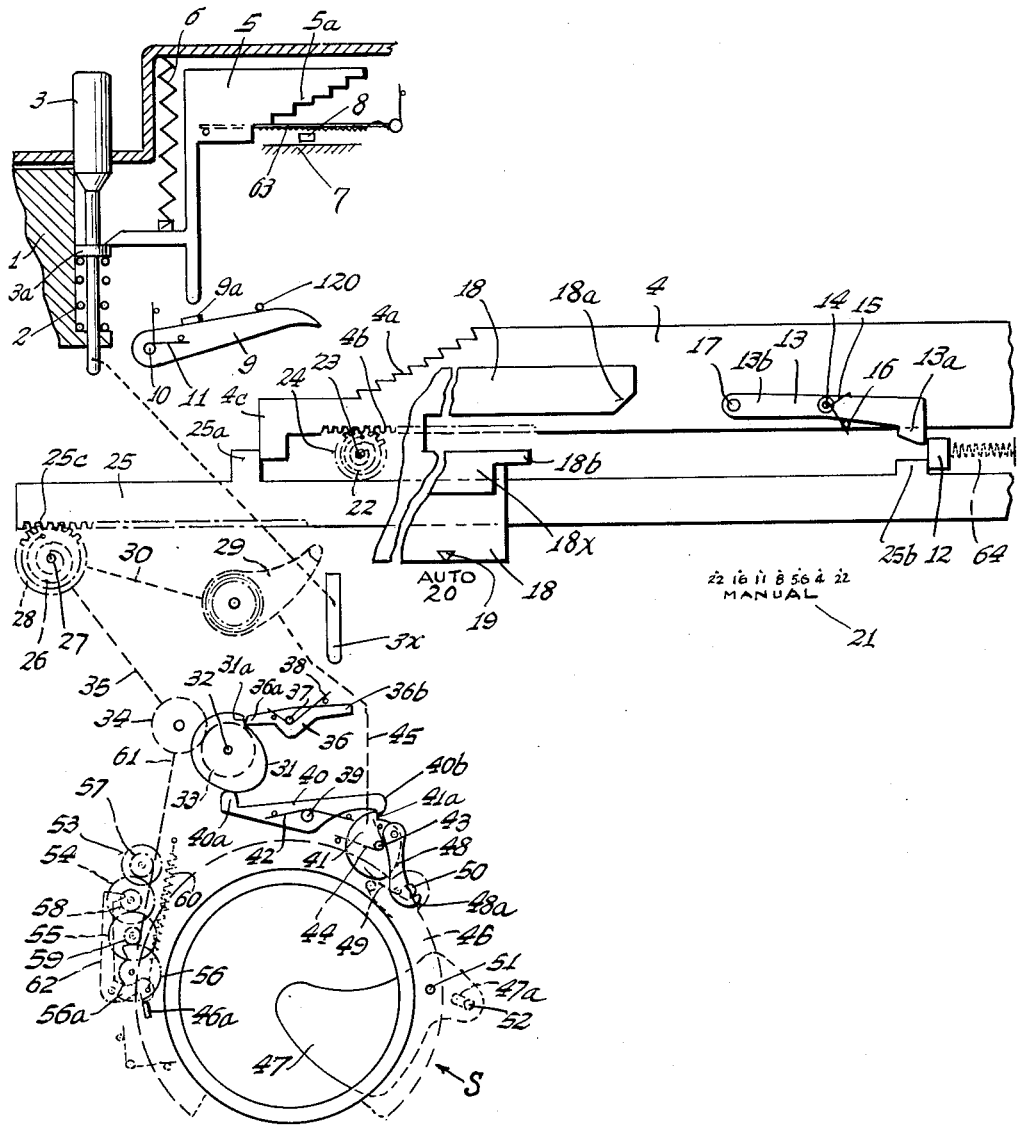
INVENTOR.
Waldemar T. Rentschler
BY
March and Curtiss
ATTORNEYS

United States Patent Office 3,037,435
Patented June 5, 1962

3,037,435
PHOTOGRAPHIC CAMERA HAVING AUTOMATIC EXPOSURE SETTING MEANS
Waldemar T. Rentschler, Calmbach (Enz), Germany, assignor to Alfred Gauthier, G.m.b.H., Calmbach (Enz), Germany, a corporation of Germany
Filed Apr. 4, 1961, Ser. No. 100,730
Claims priority, application Germany Apr. 7, 1960
2 Claims. (Cl. 95—10)

This invention relates to photographic cameras of the automatic setting type, wherein there is a manually operable selector member which may be placed in "automatic" and "non-automatic" positions in order to obtain the desired mode of operation, and wherein there is a manually operable setting member which is rendered operative for the "non-automatic" diaphragm aperture, shutter speed or the like. In cameras of this type, the automatic exposure setting is effected by a control member which is connected with a light intensity measuring device and which has a powered driving mechanism, said control member being cooperable with a cocking and release device including a cocking member and having a stop which is engageable with an adjusting member for the exposure factor whereby the latter member follows the setting motion of the control member under the action of spring power.

An object of the present invention is to provide a novel and improved camera of the automatic setting type as above outlined, wherein the control influence of the automatic exposure regulating device may be readily discontinued when it is desired to manually set the camera, such action being effected in a simple and economical manner, and independently of the prevailing indicating or operating state of the light intensity measuring device.

This is accomplished, in accordance with the invention, by the provision of a movably mounted stop on the control member, for engagement with the exposure adjusting member, and by the provision of simple means responsive to placing the selector member in its "non-automatic" position, for rendering the said stop inoperative so as to discontinue the control influence of the control member, as by shifting the stop out of the path of movement of the exposure adjusting member, all in conjunction with a second stop which is also engageable with the adjusting member and is connected to a manually operable means, such second stop being shiftable by movement of the manually operable means into an operative position for effecting said engagement. Further, the arrangement is such that both the control member and the exposure adjusting member can be shifted, in response to operation of the cocking and release device, into starting positions which are associated with the cocked state of the driving means for said members, and can be retained in such starting position.

Thus, in a camera constructed in accordance with the invention, the disconnection of the automatic exposure regulating mechanism for the elimination of the control influence of the same when the camera is adjusted for the "non-automatic" setting, is effected by simply shifting against spring action the stop which is movably mounted on the control member and which serves to limit the setting or adjusting movement of the exposure adjusting member, such shifting being effected in response to placing the selector member into its "non-automatic" position. The stop is shifted out of the path of motion of the exposure adjusting member, and the second stop mentioned above, which is also engageable with the exposure adjusting member and which is connected with the manually operable means, is simultaneously shifted into an operative, engaging position. Thus, in order to discontinue the control influence of the automatic exposure regulating device in the case of exposures which are to be made by manual adjustment of the exposure factor there is required in a camera constructed in accordance with the invention neither special coupling means disposed in the connection between the control member and the light intensity measuring device, nor special actuating or control means for releasing such coupling means. The present invention and arrangement thus results, on the one hand, in an optimally simple, compact and economical structure of the camera and on the other hand in complete freedom of mobility and flexibility in the construction and operation of the automatic exposure regulating mechanism. In addition, a camera as thus provided by the invention is distinguished, by virtue of the above-described simple and uncomplicated structure, by a particularly high degree of functional dependability.

In accordance with a further construction provided by the invention, a particularly advantageous arrangement involving the members or components and the operational simplicity and clarity is obtained by constituting the selector member so that it also serves as the manually operable means which is actuated to effect manual adjustment of the exposure factor. In contributing to the above advantageous construction, the provision of a control cam which constitutes the actuating member for disconnecting the movably mounted stop is of importance. The said control cam is provided on the selector member and is arranged, with respect to the said second stop, in such a manner that upon the selector member being shifted to the "non-automatic" position, the movable stop is disconnected by the cam prior to the second stop becoming operative to engage the adjusting member.

The invention will now be explained by way of an embodiment which is diagrammatically illustrated in the accompanying FIGURE.

Referring to said figure, the case or housing of the photographic camera is indicated by the numeral 1. Affixed to the housing 1 in a well-known manner (not shown) is a photographic intra-lens shutter construction indicated generally by the letter S of which only the shutter driving mechanism and certain associated components are illustrated for reasons of clarity of illustration. For the purpose of releasing the shutter, a release member or plunger 3 is provided, movable vertically as seen in the figure or in a direction perpendicular to the axis of the camera, against the action of the compression coil spring 2, such release plunger being mounted on the camera case 1.

For the purpose of automatically setting the shutter i.e. the exposure factor of the camera as for example the diaphragm aperture, there is provided a control member 4 (to be described below) and a cooperable sensing member by means of which latter there may be effected a sensing of the position of the movable member of a measuring device, constituting part of an automatic electric exposure meter which is built into the camera. Such sensing operation is well known per se, and is effected automatically in response to actuation of the camera release member 3.

The sensing member 5, which may for example be constructed as a slide having bearings on the fixed portion of the measuring mechanism (instrument movement or galvanometer) of the exposure meter is shown as movable in a direction parallel to the movement of the release plunger 3. The sensing member 5 is acted on by a compression spring 6 which tends to keep it in engagement with a collar or flange 3a provided on the release member 3. The spring 6 is weaker than, and is overcome by the spring 2. In order to cooperate with the movable member of the measuring mechanism, the sensing member 5 has a stepped setting edge 5a by means of which it engages, in response to actuation of the release member 3 and under the influence of the spring 6, a needle 8 which is connected to the movable member of the measuring mechanism and is shiftable over a supporting surface or member 7.

A lever 9 serves to operatively connect the sensing member 5 to the control member 4. The said lever 9 is positioned about an axis 10 provided on the camera or on the intra-lens shutter structure of the camera, and is normally held engaged (when not in operation) with a fixed stop pin 120 by a wire spring 11. The lever 9 has a lug 9a arranged for engagement with the lower, driving portion of the sensing member 5, as clearly shown in the figure.

There is further provided a stepped setting edge 4a on the control member 4, the individual steps of which are correlated with different exposure values located in the operating range of the shutter. The lever 9 is cooperable with the stepped edge 4a in such a manner that it terminates the right-to-left setting movement of the control member (as effected by a powered driving mechanism to be described below) halting the control member in a position which is indicative of the existing light conditions to which the exposure regulator responds. The particular operative position of the stop lever 9 results in one of the steps 4a impinging on the tip of the lever, thereby to halt the control member 4 in said given position which is a function of existing light conditions.

The control member 4 serves to control the adjusting movement of an exposure adjusting member which, in the illustrated embodiment of the invention, is connected to effect adjustment of the diaphragm aperture. The adjusting member has or comprises an arm 12 which is under the influence of a compression coil spring 64, such arm being arranged to have a path of movement which is adjacent the movable control member 4. When the adjusting member 12 is free to shift under the action of the driving spring 64 it will move from right to left to an extent which is determined by the adjusted position of the control member 4. Release of the adjusting member 12 for such movement is effected in response to actuation of the camera release member 3, this being effected specifically in any well known manner and being indicated diagrammatically in the figure, as will be explained below in detail. The extent of movement of the adjusting member 12 is limited by a stop member 13 (to be described in detail below) which is movably mounted on or connected to the control member 4 and is engageable by the said adjusting member.

In order to enable exposures to be effected with either the automatic or the non-automatic mode of operation, the camera or camera shutter further comprises a manually operable selector member which is settable at "automatic" and "non-automatic" positions, there being further manually operable means which are operative when the selector member is in "non-automatic" position for the purpose of positioning the exposure adjusting member (in the case of exposures which are to be made without benefit of the automatic exposure regulator). Details of these will be given below. The invention further provides a cocking and release device (to be described below) by means of which the control member 4 can be shifted into the cocked position shown in the figure, and can be retained in such position.

The control influence of the control member 4 in the case of exposures which are to be made without benefit of the automatic exposure regulator, is rendered ineffective, in accordance with the invention, by providing a movable mounting for the stop lever 13 (which cooperates with the arm 12 of the diaphragm adjusting member) on the control member 4 and by arranging such stop to be shifted, in response to the selector being set in the "non-automatic" position, out of the path of movement of the adjusting member 12. There is further provided a second stop engageable with the adjusting member 12, said second stop being connected to and controlled by a manually operable means which, in the illustrated embodiment of the invention, may constitute the selector member 18 or a member rigidly affixed thereto. The second stop is shiftable into an operative position when the selector member is placed in the "non-automatic" or manual setting. Both the control member 4 and the diaphragm adjusting member 12 can be shifted, by means of a cocking and release device, into a starting position which is associated with the cocked state of the respective driving means provided for such member and device. Also, the said adjusting member and release device may be retained in these starting positions, as will be shortly explained.

The movable stop or lever 13 on the control member 4 is turnable about an axis 14 and is positioned by a fixed pin 16 and a biasing spring 15. One arm 13a of the lever 13 is engageable with the adjusting arm 12 whereas the other lever arm 13b carries a cam follower pin 17 affixed thereto, which is cooperable with a cam 18a on the selector member 18.

For the purpose of reducing the number of components required, and also to enable a quick and clear setting operation of the camera to be effected, the selector 18 is arranged to also constitute the manually operable means for effecting manual adjustment of the diaphragm. For this purpose, a setting mark 19 is provided on the selector member 18, by which the proper position and adjustment of such member may be had. The setting mark 19 is cooperable with a fixed setting or index mark 20 which is identified by the word "auto," and is also cooperable with a diaphragm scale 21 and with the word "manual" disposed adjacent the said scale.

The control of the movement of the diaphragm adjusting member 12, in the case of exposures made with both "automatic" and "non-automatic" settings, is effected in two different ways. Upon the selector member 18 being placed in the "automatic" position as shown in the figure, the lever 13 will occupy the indicated position wherein its stop arm 13a is disposed in the path of movement of the arm 12 of the diaphragm adjusting member. The magnitude or extent of movement of the diaphragm setting member 12 as the latter "runs down" from its cocked position shown towards the left is thus determined by this stop arm, which is connected with the exposure meter by means of the members 4, 9 and 5.

If, on the other hand, for the purpose of effecting exposures involving a non-automatic or manual adjustment of the diaphragm, the combined selector and setting member 18 is positioned so that the mark 19 indicates a value on the diaphragm scale 21, the lever 13 will be pivoted counterclockwise by the cam 18a of the setting member 18 against the action of the spring 15, whereby its stop arm 13a will be swung out of the path of movement of the arm 12 of the diaphragm adjusting member. In place of the stop lever 13 which limits the extent of movement from right to left of the diaphragm adjusting member 12 there is now used a second stop 18b which is constructed on and arranged to be shifted concurrently with movement of the selector and setting member 18. The stop 18b is so arranged that it may engage the arm 12 of the diaphragm adjusting member when the selector member 18 is placed in the "manual" position and when the diahpragm adjusting member is freed and moves under the action of its spring 64 from right to left. The second stop 18b may be affixed directly to the selector member 18, or it may be carried by a separate member 18x which is affixed to the selector member 18 where the latter is to also constitute the means for effecting manual adjustment of the diaphragm. Or the member 18x may be movable independently of and with respect to the selector member 18, if the manual adjustment of the diaphragm is to be done independently of any adjusting movement of the selector member 18. In order to hold the combined selector and setting member 18 in any adjusted position when it is used in conjunction with the diaphragm scale 21, a detent device such as a friction arm, friction washer, etc., of any known kind may be utilized, or else a notched arrangement all of which are well known devices.

The above organization produces, in a surprisingly simple and economical manner and without the necessity for altering the automatic exposure regulating mechanism of the camera, an effective elimination or abolishment of the control influence of the control member 4 where non-automatic exposures are to be made.

As already mentioned, a driving mechanism is associated with the control member 4, by means of which the latter is automatically shifted or driven. This driving mechanism is shown diagrammatically in the figure and comprises a spiral coil spring 22 which is at one end affixed to an axis 23 having a gear 24, the other end of the spring being connected to the gear itself. The gear 24 engages a rack 4b provided on the control member 4.

The cocking of this driving mechanism, as well as the cocking of the spring 64 which is associated with the diaphragm adjusting member 12, takes place jointly in response to operation of the film transport of the camera, by means of a cocking member 25 which cooperates with the control member 4 and with the diaphragm adjusting member 12. On the cocking member 25 there are provided arms or lugs 25a and 25b, which together with an arm 4c of the control member and the arm 12 of the diaphragm adjusting member constitute unilateral or unidirectionally acting couplings or driving devices to shift the control member 4 and adjusting member 12 to their starting positions as shown, when the cocking member 25 is moved from a leftmost position to the rightmost position shown.

A driving mechanism for the shutter release device (to be described in detail below) is also connected with the cocking member 25. The said driving mechanism comprises a driving spring 26 and a gear 28 connected to one end of the spring, both of these components being positioned about an axis 27 and the gear meshing with a rack 25c provided on the cocking member 25. The driving mechanism is cocked by means of the film transport device of the camera through the medium of a gear drive which is diagrammatically indicated by the broken line 30 in the figure, such gear drive interconnecting the gear 28 and a film transport lever 29.

The shutter release device which is actuated by means of the driving mechanism 26, 27, 28 comprises a cam disk 31 which is carried by a spindle 32 and is connected to the driving mechanism by means of gears 33, 34 and gearing 35, the latter being diagrammatically indicated by the broken line shown in the figure and having the same number. An arresting or detent lever 36 cooperates with the cam disk 31 and serves to retain the same in a cocked position as shown in the figure, whereby the cocking member 25 is also retained in its cocked position, as well as the control member 4 and the diaphragm adjusting member 12. Such cocked or starting positions are associated with the cocked state of the individual driving devices associated with the control member 4 and adjusting member 12. The arresting lever 36 is carried by an axis 37 provided on the camera or else on the intralens shutter housing, and is acted on by a spring 38 which biases it in a counterclockwise direction. When the members 4, 12 and 25 are in their cocked positions, a projection or shoulder 31a provided on the cam disk 31 engages one arm 36a of the arresting lever 36, whereas the other arm 36b of the lever is located in the path of movement of a release member 3x movable concurrently with the camera release plunger 3.

The cam disk 31 controls a detent lever 40 which is carried by an axis 39 and is provided to hold in the cocked condition a well-known main driving disk 41 of the shutter. One arm 40a of the detent lever 40 engages under the action of a spring 42, the outside circumference or periphery of the cam disk 31 and constitutes a cam follower therefor. The other arm 40b of the detent lever 40 cooperates, for the purpose of holding the driving disk 41 in its cocked position as shown, with a projection 41a provided on the driving disk 41.

The driving disk 41 is carried by a spindle 43 in the shutter, and is influenced or biased by a driving spring 44. The cocking of the driving disk 41 is also effected in response to operation of the film transport device 29, and a broken line 45 is shown to indicate gearing which interconnects the driving disk 41 and the film transport lever 29.

For the purpose of actuating a driving ring 46 for the shutter blades 47 (only one of which latter is shown in the figure for reasons of clarity of illustration) a driving link 48 is pivotally carried by the driving disk 41. The link 48 has a notch 48a which receives a semi-circular pin 50 affixed to the shutter blade driving ring 46, such link being retained in engagement with the pin by a spring 49, all in a well-known manner. As is understood in the art, clockwise running down movement of the driving disk 41 effects a reciprocating movement of the shutter blade driving ring 46 whereby the shutter blades 47 are thereby opened, and having reached an open position are again closed. The shutter blades 47 are positioned about pins 51 on the driving ring 46, and are in addition provided with guide slots 47a through which fixed pins 52 extend, these latter constituting pivot points for the blades.

In order to make sure that the diaphragm adjusting member 12 reaches its proper adjusted position as determined by either the stop 13a or else the stop 18b (depending on automatic or manual procedure) prior to opening of the shutter, a well-known delayed action mechanism is arranged and made operative in response to actuation of the camera release. By such device, the start of opening of the shutter is delayed by a certain predetermined period of time after actuation of the release member 3. The said period of time is so selected that, within such interval the control member 4 can travel the maximum permissible extent and any vibrations of the camera or shutter mechanism caused during the running down of the control member 4, diaphragm adjusting member 12 and cocking member 25 will have ceased or faded.

The delayed action mechanism, in the illustrated embodiment of the invention, comprises gears 53, 54, 55 and 56 as well as pinions 57, 58 and 59 which mesh in the manner shown in the figure.

Connected with the gear 56 is a driving spring 60. The latter is stressed in response to actuation of the film transport device, by gearing which is not shown but indicated by the broken line 61 extending between the gear 34 and the gear 56. Any suitable specific gearing or transmission device may be employed, as will be understood. The gearing may, for example, be connected between the driving disk 41 of the shutter and the gear 56, as is a usual arrangement. The delayed action mechanism is retained in its cocked position by means of an arresting lever 62 which cooperates with the pinion 58. The arresting lever 62 is released by a lug 46a carried by the shutter blade driving ring 46, which lug (after the shutter has been released) pivots the arresting lever 62 out of engagement with the pinion 58. The delayed action mechanism is released before the shutter blades 47 start to open, and subsequently the lug 46a impinges on a control surface provided on the outer periphery of the gear 56. The shutter blades are still in a closed state when this occurs. The delayed action mechanism now runs down to such an extent that a notch 56a on the gear 56 is presented to the lug 46a. When this occurs the shutter blade driving ring is able to continue its running down movement under the action of the driving spring 44, and in so doing, the ring opens and closes the shutter blades 47. The construction and operation of this type of delayed action device is well known.

Operation of the camera of the present invention is as follows:

(a) Exposures with the automatic exposure setting mechanism operative.

As is apparent from the figure, the combined selector and setting member 18, for this purpose, is placed in the "automatic" position. In this position, the influence of the cam 18a of the selector and setting member on the pin 17 of the stop lever 13 is eliminated or discontinued, so that the stop lever occupies the operative position shown in the figure as effected by the spring 15. When the camera mechanism is in the cocked state, as is shown and illustrated, it is merely necessary to depress the release plunger 3 in order to effect an exposure. This movement of the release plunger is followed by movement of the sensing member 5 under the action of the compression spring 6, during which operation the measuring mechanism needle 8 is clamped in adjusted position by means of a clamping lever 63 (in a well known manner). The sensing member 5 shifting downward comes into engagement with the lever 9 and pivots the same against the action of the spring 11, this movement continuing until one of the steps 5a of the sensing member 5 impinges on the needle 8 of the measuring mechanism. Such impingement terminates the movement of the sensing member 5 downward. At the same time, the release member 3 impinges at its lower end 3x on the arresting lever 36, shifting the same clockwise out of engagement with the cam disk 31. This has the effect of releasing the cam disk 31, the cocking member 25, and the control member 4 as well as the diaphragm adjusting member 12, whereby these components can run down under the action of the associated power spring devices. The cam disk 31 also releases the shutter by effecting counterclockwise swinging movement of the detent lever 40. After release of the shutter has been effected, the delayed action mechanism becomes operative in the above described manner and prevents an immediate opening of the shutter blades.

The control member 4 when released for running down movement from right to left engages, after a longer or shorter extent of movement, the lever 9 which has been pre-set by the sensing member 5. Such engagement occurs between one of the steps 4a on the control member and the pointed tip of the lever. The diaphragm adjusting member 12 follows such running down movement of the control member 4 under the action of its spring 64, and such adjusting member is halted in a position which corresponds to the prevailing light intensity and to the setting of any additional exposure factors, such as exposure time (shutter speed) and film sensitivity. The adjusted position of the member 12 is determined by impingement of the arm 12 on the stop lever 13, 13a. This terminates the automatic exposure setting.

(b) Effecting an exposure without utilizing the automatic exposure setting, and adjusting the diaphragm manually.

For this purpose, it is merely necessary to set the combined selector and setting member 18 at the desired diaphragm value on the scale 21, utilizing the setting mark 19. When effecting this setting, the cam 18a of the selector member engages the pin 17 of the stop lever 13, 13a, pivoting the said lever in a counterclockwise direction so that the end 13a is shifted out of the path of movement of the arm 12 of the diaphragm adjusting member. The stop lever 13 is now no longer effective or engageable with the arm 12, but instead engagement occurs between such arm 12 and the stop 18b which is rigidly affixed to the selector member 18. The selector member 18 thus constitutes a manually operable member for adjusting the diaphragm aperature. When the arm 12 of the diaphragm adjusting member is engaged with the stop 18b, subsequent to right-to-left movement of the cocking member 25 (wherein the lug 25b thereof shifts to the left and becomes disengaged from the arm 12) the diaphragm adjusting member will have effected the proper diaphragm aperture as determined by the diaphragm scale 21 and setting mark 19.

In a camera as thus constructed in accordance with the invention, the prevailing operational state of the camera is completely immaterial, as regards setting the camera for either automatic or else non-automatic or manual diaphragm adjustment, and vice versa. The setting operation can thus be carried out in any operating or indicating state of the light intensity measuring device, and both for the cocked and uncocked condition of the camera. This result is obtained by virtue of the stops which are used for coupling the exposure adjusting member to both the control member and to the manually operable selector member. By such arrangement, the stop which is connected to the control member and is movably arranged thereon can be disconnected or rendered inoperative, and the stop which is associated with the manual setting member or manually operable means (constituted as the selector member) can be shifted into an operative position in response to the selector being placed in the "non-automatic" position. In addition, the above result is accomplished by the provision of separate direct connections between the cocking and release member on the one hand and the exposure adjusting member and the control member on the other hand, by virtue of which the adjusting and control members can be shifted into their starting or cocked positions in response to a corresponding movement of the cocking and release member, and can be releasably retained in such positions by the cocking and release member (in the illustrated embodiment). This latter arrangement has the effect that the exposure adjusting member can be shifted into its cocked position even when the connection between the control member and the exposure adjusting member is rendered inoperative, as by the selector being placed in its "non-automatic" position.

Both the control member 4 and the cocking member 25, as well as the selector and setting member 18 are shown in the figure as longitudinally displaceable slide-like structures, in order to represent them in a simple and clear manner. However, this manner of representation for these members is not to be considered as a limitation with respect to the construction of the members. Instead, when embodying the invention in a specific camera, the said members may be constructed in any appropriate manner as for example in the form of either slides, rings or disks. Instead of the movable stop on the control member being constituted as a pivotal lever, it may be in the form of a slide-like member which can be shifted out of the path of movement of the exposure adjusting member by means of actuating components provided on the selector 18 in response to such member being placed in the non-automatic position.

I claim:

1. In an automatically settable photographic camera, in combination, a manually operable selector member which is positionable in "automatic" and "non-automatic" positions; a movable control member adapted for connection with a light-intensity measuring device to be adjustably positioned thereby; power driving means for said control member; a cocking and release device having a movable cocking member; an exposure-factor adjusting member and spring means acting on the same, said adjusting member being movable in a path adjacent the control member; a stop movably mounted on the control member and engageable with the adjusting member to enable the latter under the action of its spring means to follow the control member; means responsive to positioning the selector member in "non-automatic" position for rendering inoperative the said stop, thereby to prevent its engagement with the adjusting member; manually operable means operative when the selector member is in "non-automatic" position and including a second stop engageable with the adjusting member for effecting positioning of the latter; means connected with the cocking member, for shifting the control and adjusting members into starting positions in response to cocking movement of the cocking member; and means for effecting retention of the control and adjusting members in said starting positions.

2. A camera as in claim 1, in which the selector member and the said manually operable means comprise a single connected combined control, in which the means rendering inoperative the stop comprises a cam disposed on the selector member, said cam and said second stop being so related that the cam is operative to render the first-mentioned stop ineffective prior to engagement of the adjusting member by the second stop when the selector member is being moved to the "non-automatic" position.

References Cited in the file of this patent
UNITED STATES PATENTS

| | | |
|---|---|---|
| 2,969,004 | Gebele | Jan. 24, 1961 |
| 2,985,082 | Starp | May 23, 1961 |
| 2,988,977 | Rentschler | June 20, 1961 |
| 2,993,422 | Rentschler | July 25, 1961 |